(12) United States Patent
Dong et al.

(10) Patent No.: US 7,244,813 B2
(45) Date of Patent: *Jul. 17, 2007

(54) METHODS OF PURIFYING POLYMERIC MATERIAL

(75) Inventors: Jiawen Dong, Rexford, NY (US); Hua Guo, Selkirk, NY (US); Robert John Hossan, Delmar, NY (US)

(73) Assignee: General Electric Company, Schenectady, NY (US)

( * ) Notice: Subject to any disclaimer, the term of this patent is extended or adjusted under 35 U.S.C. 154(b) by 210 days.

This patent is subject to a terminal disclaimer.

(21) Appl. No.: 10/648,604

(22) Filed: Aug. 26, 2003

(65) Prior Publication Data

US 2005/0046070 A1    Mar. 3, 2005

(51) Int. Cl.
*C08F 6/00* (2006.01)
(52) U.S. Cl. .................. 528/480; 264/85; 264/140; 264/176.1; 369/275.4; 428/64.2; 428/65.1
(58) Field of Classification Search ............ 264/85, 264/140, 176.1; 369/275.4; 428/64.2, 65.1; 528/480
See application file for complete search history.

(56) References Cited

U.S. PATENT DOCUMENTS

| | | |
|---|---|---|
| 3,306,874 A | 2/1967 | Hay |
| 3,306,875 A | 2/1967 | Hay |
| 3,365,422 A | 1/1968 | Van Dort |
| 3,383,435 A | 5/1968 | Cizek |
| 3,457,343 A * | 7/1969 | Van Lohuizen et al. ..... 264/184 |
| 3,563,849 A * | 2/1971 | Rye et al. ................... 428/395 |
| 3,639,656 A | 2/1972 | Bennett et al. |
| 3,642,699 A | 2/1972 | Cooper et al. |
| 3,661,848 A | 5/1972 | Cooper et al. |
| 3,733,299 A | 5/1973 | Cooper et al. |
| 3,838,102 A | 9/1974 | Bennett et al. |
| 3,962,181 A | 6/1976 | Sakauchi et al. |
| 3,973,890 A | 8/1976 | Porter et al. |
| 4,054,553 A | 10/1977 | Olander |
| 4,083,828 A | 4/1978 | Olander |
| 4,092,294 A | 5/1978 | Bennett, Jr. et al. |
| 4,373,065 A | 2/1983 | Prest, Jr. |
| 4,421,470 A | 12/1983 | Nakamura |
| 4,500,706 A | 2/1985 | Mathis et al. |
| 4,760,118 A | 7/1988 | White et al. |
| 4,804,712 A * | 2/1989 | Traugott et al. ............ 525/152 |
| 4,808,262 A | 2/1989 | Aneja et al. |
| 4,845,142 A | 7/1989 | Niwano et al. |
| 4,965,028 A | 10/1990 | Maus et al. |
| 4,987,194 A | 1/1991 | Maeda et al. |
| 4,992,222 A | 2/1991 | Banevicius et al. |
| 4,994,217 A | 2/1991 | Banevicius et al. |
| 5,017,655 A | 5/1991 | Kase et al. |
| 5,053,288 A | 10/1991 | Hashimoto et al. |
| 5,102,591 A | 4/1992 | Hasson et al. |
| 5,130,356 A | 7/1992 | Feuerherd et al. |
| 5,135,791 A | 8/1992 | Imai et al. |
| 5,204,410 A | 4/1993 | Banevicius et al. |
| 5,250,486 A | 10/1993 | Shaffer |
| 5,586,110 A | 12/1996 | Nakaki |
| 5,607,700 A | 3/1997 | Kando et al. |
| 5,833,848 A | 11/1998 | Tominari et al. |
| 6,015,512 A * | 1/2000 | Yang et al. .................. 264/2.2 |
| 6,183,829 B1 | 2/2001 | Daecher et al. |
| 6,306,978 B1 | 10/2001 | Braat et al. |
| 6,365,710 B1 | 4/2002 | Wang et al. |
| 6,372,175 B1 | 4/2002 | Inoue et al. |
| 6,407,200 B1 | 6/2002 | Singh et al. |
| 6,437,084 B1 | 8/2002 | Birsak et al. |
| 6,444,779 B1 | 9/2002 | Singh et al. |
| 6,469,128 B1 | 10/2002 | Guo et al. |
| 6,475,589 B1 | 11/2002 | Pai-Paranjape et al. |
| 6,667,952 B2 | 12/2003 | Komaki et al. |
| 6,696,528 B2 * | 2/2004 | Moses et al. ................ 525/395 |
| 6,775,838 B2 | 8/2004 | Hayashida et al. |
| 6,924,350 B2 | 8/2005 | Dong et al. |
| 6,949,622 B2 | 9/2005 | Silvi et al. |
| 2001/0000520 A1 | 4/2001 | Braat et al. |
| 2002/0048691 A1 | 4/2002 | Davis et al. |
| 2002/0055608 A1 | 5/2002 | Braat et al. |
| 2002/0062054 A1 | 5/2002 | Cistone et al. |
| 2002/0094455 A1 | 7/2002 | Feist et al. |
| 2002/0161606 A1 | 10/2002 | Bates et al. |
| 2002/0197438 A1 | 12/2002 | Hay et al. |
| 2002/0197441 A1 | 12/2002 | Hariharan et al. |
| 2003/0044564 A1 | 3/2003 | Dris et al. |

(Continued)

FOREIGN PATENT DOCUMENTS

EP    0 225 801    12/1986

(Continued)

OTHER PUBLICATIONS

International Search Report; International Application No. PCT/US2004/027237; Applicant's Reference No. 126750; International Filing date Aug. 23, 2004; Date of Mailing Nov. 11, 2004; 6 pages.

(Continued)

*Primary Examiner*—Terressa Boykin
(74) *Attorney, Agent, or Firm*—Cantor Colburn LLP

(57) ABSTRACT

A method is disclosed to purify a polymeric material by filtering a melt comprising poly(arylene ether) and poly(alkenyl aromatic) through a melt filtration system. The method provides a polymeric material having reduced levels of particulate impurities. The polymeric material prepared is suitable for use in data storage media applications.

28 Claims, No Drawings

U.S. PATENT DOCUMENTS

| | | |
|---|---|---|
| 2003/0067089 A1 | 4/2003 | Wang et al. |
| 2005/0048252 A1 | 3/2005 | Dris et al. |
| 2005/0049333 A1 | 3/2005 | Buckley et al. |
| 2005/0049362 A1 | 3/2005 | Buckley et al. |
| 2005/0049393 A1 | 3/2005 | Silvi et al. |
| 2005/0064129 A1 | 3/2005 | Dong et al. |
| 2005/0117405 A1 | 6/2005 | Dris et al. |
| 2005/0129953 A1 | 6/2005 | Breitung et al. |
| 2005/0180284 A1 | 8/2005 | Hay et al. |
| 2005/0202201 A1 | 9/2005 | Hay et al. |
| 2005/0233151 A1 | 10/2005 | Feist et al. |
| 2005/0234218 A1 | 10/2005 | Silvi et al. |
| 2005/0234219 A1 | 10/2005 | Silvi et al. |
| 2005/0250932 A1 | 11/2005 | Hossan et al. |
| 2006/0089487 A1 | 4/2006 | Silvi et al. |

FOREIGN PATENT DOCUMENTS

| | | | |
|---|---|---|---|
| EP | 0 271 000 | | 12/1987 |
| EP | 0 295 891 | | 6/1988 |
| EP | 0 303 209 | | 8/1988 |
| EP | 0 375 937 | | 7/1990 |
| EP | 0 642 124 | | 9/1994 |
| EP | 0 724 259 | | 1/1996 |
| EP | 0 770 637 | | 10/1996 |
| EP | 1 047 055 | | 4/1999 |
| EP | 1 031 972 | | 2/2000 |
| EP | 1 130 587 | | 3/2001 |
| EP | 1 167 419 | | 6/2001 |
| EP | 1 167 420 | | 6/2001 |
| EP | 1 167 421 | | 6/2001 |
| JP | 5192307 | * | 8/1976 |
| JP | 63-13722 | | 1/1988 |
| JP | 63-86738 | | 4/1988 |
| JP | 63-91231 | | 4/1988 |
| JP | 63-91232 | | 4/1988 |
| JP | 63091231 | * | 4/1988 |
| JP | 63-256427 | | 10/1988 |
| JP | 63256427 | * | 10/1988 |
| JP | 63-301247 | | 12/1988 |
| JP | 63-309547 | | 12/1988 |
| JP | 64-42601 | | 2/1989 |
| JP | 1-92209 | | 4/1989 |
| JP | 2-107651 | | 4/1990 |
| JP | 2-208342 | | 8/1990 |
| JP | 9-237437 | | 9/1997 |
| WO | WO 92/05940 A | | 4/1992 |
| WO | WO 01/11618 | | 2/2001 |
| WO | WO 02/43943 | | 6/2002 |

OTHER PUBLICATIONS

International Search Report; International Application No. PCT/US2004/027605; Applicant's Reference No. 135946; International Filing date Aug. 26, 2004; Date of Mailing Dec. 17, 2004; 7 pages.
JP11268098. Publication Date Oct. 5, 1999. Abstract Only.
JP58147332. Publication Date Sep. 2, 1983. Abstract Only.
JP6093014. Publication Date Apr. 5, 1994. Abstract Only.
Paul F. Ranken "Flame Retardants" Plastics Additives Handbook, 5th Edition. Hanser Publishers, Munich. 2001. pp. 681-696.
R. Scherrer. "Colorants". Plastics Additives Handbook, 5th Edition. Hanser Publixhers, Munich. 2001. pp. 813-882.
http://www.atofina.com/groupe/gb/actucomm/print.cfm?IdComm=5052.
International Search Report ; International Application No. PCT/US2004/027694; International Filing Date Aug. 25, 2004; Applicant's File Reference No. 131982; Date of Mailing Dec. 27, 2004, 6 pages.
International Search Report ; International Application No. PCT/US2004/028603; International Filing Date Aug. 11, 2005; Applicant's File Reference No. 08CN 126750-4; Date of Mailing Dec. 22, 2005; 7 pages.
JP 63 256427, Optical Element Manufacture Resin Composition Aromatic Polyvinyl Polymer Polyphenylene Ether; Oct. 24, 1988; Section Ch, Wekk 198848, Derwent Publications Ltd., London, GB, AN 1988-342863; XP002303242; Abstracts; only one page.
JP63-056832, Publication date Nov. 3, 1998, 1 page, Abstract Only.
Plant Design, Encyclopedia of Polymer Science, 1990, 252-253, Published by John Wiley & Sons, Inc.

* cited by examiner

METHODS OF PURIFYING POLYMERIC MATERIAL

BACKGROUND OF INVENTION

The present methods are directed to purifying polymeric material by filtering melts comprising poly(arylene ether) and/or poly(alkenyl aromatic) resins. The methods are more particularly directed to filtering melts comprising poly(arylene ether) and/or poly(alkenyl aromatic) resins to result in filtered polymeric materials having reduced amounts of particulate impurities.

Optical, magnetic and magneto-optic media are primary sources of high performance storage technology that enable high storage capacity coupled with a reasonable price per megabyte of storage. Areal density, typically expressed as billions of bits per square inch of disk surface area (gigabits per square inch ($Gbits/in^2$)), is equivalent to the linear density (bits of information per inch of track) multiplied by the track density in tracks per inch. Improved areal density has been one of the key factors in the price reduction per megabyte, and further increases in areal density continue to be demanded by the industry.

In the area of optical storage, advances focus on access time, system volume, and competitive costing. Increasing areal density is being addressed by focusing on the diffraction limits of optics (using near-field optics), investigating three dimensional storage, investigating potential holographic recording methods and other techniques.

Polymeric data storage media has been employed in areas such as compact disks (CD) and recordable or re-writable compact discs (e.g., CD-RW), and similar relatively low areal density devices, e.g. less than about 1 $Gbits/in^2$, which are typically read-through devices requiring the employment of a good optical quality substrate having low birefringence.

Unlike the CD, storage media having high areal density capabilities, typically up to or greater than about 5 $Gbits/in^2$, employ first surface or near field read/write techniques in order to increase the areal density. For such storage media, although the optical quality of the substrate is not relevant, the physical and mechanical properties of the substrate become increasingly important. For high areal density applications, including first surface applications, the surface quality of the storage media can affect the accuracy of the reading device, the ability to store data, and replication qualities of the substrate.

While there are materials presently available for use in data storage media, there remains a need for additional polymeric materials possessing the combined attributes necessary to satisfy the increasingly exacting requirements for data storage media applications.

SUMMARY OF INVENTION

The above-described needs are alleviated by a method of purifying a polymeric material comprising melt blending poly(arylene ether) and poly(alkenyl aromatic) in an extruder to form a melt; and melt filtering the melt through a melt filtration system to produce a filtered polymeric material; wherein the melt has a residence time in the extruder of less than or equal to about 5 minutes.

Other embodiments, including articles made from the filtered polymeric material, are described below.

DETAILED DESCRIPTION

Due to the surface quality requirements of high areal density storage media, it is desirable that current data storage media are prepared from materials containing limited quantities of particulate impurities. Visible particulate impurities, such as gels and carbonized polymeric material, are undesirable as an aesthetic defect resulting in a consumer's perception of an inferior quality product. Particles having sizes larger than about 50 micrometers can act as stress concentrators in molded articles, thereby reducing the impact strength of these articles. Particulate impurities about 1 micrometer in size contribute to an increase in haze which can affect the transmittance of light through or transparency of articles molded from material containing such impurities. Most importantly, particulate impurities may affect surface quality of storage media thereby affecting read accuracy, data storage, and replication.

Visible particulates or "black specks" and microscopic particulates are often present in poly(arylene ether) compositions as the poly(arylene ether) is subject to oxidative degradation at high temperatures. Poly(arylene ether)s tend to form carbonized "black specks" when processed at high extruder shear rates and/or at high temperatures.

The above-described needs are alleviated by a method of purifying a polymeric material comprising melt blending poly(arylene ether) and poly(alkenyl aromatic) in an extruder to form a melt; and melt filtering the melt through a melt filtration system to produce a filtered polymeric material; wherein the melt has a residence time in the extruder of less than or equal to about 5 minutes. The filtration removes particulate impurities present in the polymeric material to result in a filtered polymeric material comprising reduced quantities of particulate impurities.

As used herein the term "polymeric material" is inclusive of a composition comprising poly(arylene ether) and/or poly(alkenyl aromatic).

As described herein, melts of polymer such as poly(arylene ether) and/or poly(alkenyl aromatic) may be melt filtered to remove particulate impurities. The residence time, temperature, and shear rate of the melt in the extruder should be controlled to minimize decomposition of the polymeric material, especially the poly(arylene ether) component. Poly(arylene ether)s are known to oxidize and form gels if maintained at high temperatures. These resins may also form carbonized "black specks" or degrade in color (darken) if processed at high temperatures. Therefore, it is preferable to minimize the residence time of the melt by choice of extruder screw design and by controlling the screw speed and feed rate. A residence time of less than or equal to about 5 minutes may be employed, with less than or equal to about 2 minutes preferred, and less than or equal to about 1 minute more preferred.

It is also preferable to minimize the residence time of the melt through the melt filtration system. The melt filtration system may be designed to provide short residence times based on the choice of the surface area of the filter and volume of the melt filtration housing. A higher filter surface area and a smaller housing volume can provide shorter residence times.

The melt filtration system of the extruder is preferably located at the terminal barrel of the extruder, and more preferably at the die head of the extruder. The extruder may comprise a single melt filtration system or multiple melt filtration systems.

Any type of extruder that is capable of providing a homogenous melt of poly(arylene ether), poly(alkenyl aromatic) and/or additional resins and additives, may be used. Useful types of extruders include, for example, a twin screw counter-rotating extruder, a twin screw co-rotating extruder, a single screw extruder, a single screw reciprocating extruder, a kneader, a compounder-extruder, a ring extruder, a combination of the foregoing, and the like. Preferably a single extruder may be used, but multiple extruders may be employed. Ring extruders typically comprise a ring of three to twelve small screws or grooved rolls around a static rod or core. The screws corotate and intermesh on two sides providing good dispersive and distributive mixing as well as the ability to control the residence time of the resin in the extruder. The intermeshing design also provides two clean wipes to the screw's shear, mixing, and kneading elements. Suitable ring extruders are those available from 3+Extruder GmbH in Germany.

When preparing blends of poly(arylene ether) solvent, monomers, and other low molecular weight materials are removed from the extruder through the vent system. A particularly useful process to improve the removal of volatile substances from poly(arylene ether) or poly(arylene ether) resin blends includes steam stripping as describe in U.S. Pat. No. 5,204,410 to Banevicius et al., U.S. Pat. No. 5,102,591 to Hasson et al., U.S. Pat. No. 4,994,217 to Banevicius, and U.S. Pat. No. 4,992,222 to Banevicius et al. Steam stripping is typically performed in an extruder comprising ports for the injection of water or steam and sufficient vacuum vent capability to remove the stripped volatiles and water. Water or steam are the preferred stripping agents, and the proportion employed is up to about 15 percent by weight of the polymer composition, to be divided equally, or unequally, among the two or more injection ports located along the length of the extruder barrel. The preferred proportion is from about 0.25 to about 15 weight percent, since an amount within this range is generally very effective for removal of volatiles without burdening the vacuum system. Most preferred is from 0.5 to about 5 weight percent.

Also contemplated are extruders comprising one or more side feeders along the extruder barrel suitable to feed additional components to the melt. Additional components include additional resins, functionalizing agents and/or additives.

The extruder is preferably run at temperatures suitable to produce an intimate blend of the components that compose the melt, but low enough to minimize decomposition of the melt. A range of extruder temperatures that may be employed are of about 260° C. to about 380° C. Within this range a temperature of less than or equal to about 340° C. may be employed, and less than or equal to about 320° C. more preferred. Also within this range a temperature of greater than or equal to about 280° C. may be employed, and greater than or equal to about 290° C. preferred.

When a twin-screw extruder is employed, the extruder operation may be defined by a specific throughput rate of about 0.5 kg/hr/cm$^3$ to about 8.0 kg/hr/cm$^3$. The specific throughput rate is defined as the throughput rate of the melt divided by the diameter$^3$ of the extruder barrel. Within this range a specific throughput rate of less than or equal to about 7.5 kg/hr/cm$^3$ may be employed, and less than or equal to about 7 kg/hr/cm$^3$ preferred. Also within this range a throughput rate of greater than or equal to about 3 kg/hr/cm$^3$ may be employed, and greater than or equal to about 5 kg/hr/cm$^3$ preferred.

In one embodiment, a melt pump or gear pump is used in combination with the extruder to provide sufficient rate and pressure of a flow of melt through the melt filtration system. The melt pump also provides the capability to control and maintain an even flow of melt through the extruder system resulting in a uniform polymeric material.

In one embodiment, the poly(arylene ether), poly(alkylene aromatic), and optional additional components may be compounded prior to the melt blending step. Any known equipment capable of compounding the components may be used, for example, mixers capable of applying shear to the components, conical screw mixers, V-blenders, twin screw compounders, Henschel mixers, and the like. Preferred compounders include counter-rotating extruders or counter-rotating conical extruders.

Any suitable melt filtration system or device that can remove particulate impurities from a melt comprising poly (arylene ether), poly(alkenyl aromatic), or a combination of the two, may be used. Preferably, the melt is filtered through a single melt filtration system, although multiple melt filtration systems are contemplated.

Suitable melt filtration systems include filters made from a variety of materials such as, but not limited to, sintered-metal, metal mesh or screen, fiber metal felt, ceramic, or a combination of the foregoing materials, and the like. Particularly useful filters are sintered metal filters exhibiting high tortuosity, including the filters prepared by PALL Corporation.

Any geometry of melt filter may be used including, but not limited to, cone, pleated, candle, stack, flat, wraparound, screens, a combination of the foregoing, and the like.

The melt filtration system may include a continuous screen changing filter or batch filters. For example, continuous screen changing filters may include a ribbon of screen filter that is slowly passed before the path of a melt flow in an extruder. The filter collects particulate impurities within the melt which are then carried out of the extruder with the filter ribbon as it is continuously renewed with a new section of ribbon.

The pore size of the melt filter may be of any size ranging from about 0.5 micrometer to about 200 micrometers. Within this range, a pore size of less than or equal to about 100 micrometers can be employed, with less than or equal to about 50 micrometers preferred, and less than or equal to about 20 micrometers more preferred. Also within this range a pore size of greater than or equal to about 1 micrometer may be used, with greater than or equal to about 7 micrometers preferred, and greater than or equal to about 15 micrometers more preferred.

The temperature of the melt filtration system is preferably of about 260° C. to about 380° C. Within this range a temperature of less than or equal to about 340° C. may be employed, and less than or equal to about 320° C. more preferred. Also within this range a temperature of greater than or equal to about 280° C. may be employed, and greater than or equal to about 290° C. preferred.

The filtered polymeric material obtained is preferably substantially free of visible particulates. "Substantially free of visible particulate impurities" means that a ten gram sample of polymeric material dissolved in fifty milliliters of chloroform ($CHCl_3$) exhibits fewer than 5 visible specks when viewed with the aid of a light box. Particles visible to the naked eye are typically those greater than 40 micrometers in diameter.

In a preferred embodiment, the filtered polymeric material recovered from the extruder is substantially free of particulate impurities greater than about 10 micrometers. "Substantially free of particulate impurities greater than about 10 micrometers" means that of a forty gram sample of polymeric material dissolved in 400 milliliters of $CHCl_3$, the number of particulates per gram having a size of about 10 micrometers is less than 200, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

Upon extrusion, the filtered polymeric material may be pelletized by methods known in the art. For example, strands of filtered polymeric material extruded from an extruder or similar device, may be cooled in clean water baths or cooled by water spray and then chopped into pellets. The water, prior to its use in the bath or spray, may be filtered to remove impurities. The pellets formed may be dried using techniques standard in the art including centrifugal dryers, batch or continuous oven dryers, fluid beds, and the like. Optionally, the filtered polymeric material may be isolated as pellets in a "clean room" to prevent contamination from the surroundings. A preferred pelletization method employs an underwater die-face pelletizer system. A suitable method of pelletizing is described in U.S. Pat. No. 6,372,175. Useful pelletizing machines, including die-face pelletizers, are described in U.S. Pat. Nos. 3,973,890, 4,421,470, and 5,607,700.

Rather than extruding pellets, the filtered polymeric material may be extruded as fibers, tubes, films, or sheets by appropriate choice of the die assembly.

The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

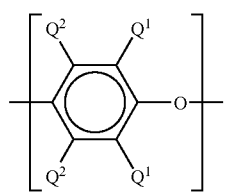

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. It will be understood that the term "haloalkyl" includes alkyl groups substituted with one or more halogen atoms, including partially and fully halogenated alkyl groups. Preferably, each $Q^1$ is alkyl or phenyl, especially $C_{1-4}$ alkyl, and each $Q^2$ is hydrogen or $C_{1-4}$ alkyl.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s used herein may further include combinations comprising at least one of the above. Preferred poly(arylene ether)s are poly(2,6-dimethylphenylene ether) and poly(2,6-dimethylphenylene ether-co-2,3,6-trimethylphenylene ether) such as those described in U.S. Pat. No. 6,407,200 to Singh et al. and U.S. Pat. No. 6,437,084 to Birsak et al.

The poly(arylene ether) generally has a number average molecular weight of about 3,000–40,000 atomic mass units (amu) and a weight average molecular weight of about 20,000–80,000 amu, as determined by gel permeation chromatography. The poly(arylene ether) may have an intrinsic viscosity (IV) of about 0.10 to about 0.60 deciliters per gram (dl/g), as measured in chloroform at 25° C. Within this range an IV of less than or equal to about 0.48 preferred, and less than or equal to about 0.40 more preferred. Also preferred within this range is an IV of greater than or equal to about 0.29, with greater than or equal to about 0.33 dl/g more preferred. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly (arylene ether) used and the ultimate physical properties that are desired.

Suitable poly(arylene ether)s include, but are not limited to, poly(2,6-dimethyl-1,4-phenylene ether); poly(2,3,6-trimethyl-1,4-phenylene) ether; poly(2,6-diethyl-1,4-phenylene) ether; poly(2-methyl-6-propyl-1,4-phenylene) ether; poly(2,6-dipropyl-1,4-phenylene) ether; poly(2-ethyl-6-propyl-1,4-phenylene)ether; poly(2,6-dilauryl-1,4-phenylene) ether; poly(2,6-diphenyl-1,4-phenylene) ether; poly(2,6-dimethoxy-1,4 phenylene) ether; poly(2,6-diethoxy-1,4-phenylene) ether; poly(2-methoxy-6-ethoxy-1,4-phenylene) ether; poly(2-ethyl-6-stearyloxy-1,4-phenylene) ether; poly (2,6-dichloro-1,4-phenylene) ether; poly(2-methyl-6-phenyl-1,4-phenylene) ether; poly(2-ethoxy-1,4-phenylene) ether; poly(2-chloro-1,4-phenylene) ether; poly(2,6-dibromo-1,4-phenylene) ether; poly(3-bromo-2,6-dimethyl-1, 4-phenylene) ether; or a mixture of the foregoing poly (arylene ether)s.

Suitable base titratable functionalized poly(arylene ether) resins include, but are not limited to, those prepared via reaction with an appropriate acid or anhydride functionalization agent. For example those prepared by melt reaction of poly(arylene ether) with alpha, beta unsaturated carbonyl compounds, including maleic anhydride, maleic acid, fumaric acid, citraconic anhydride, citraconic acid, itaconic anhydride, itaconic acid, aconitic anhydride, aconitic acid, and their esters and amines; alpha-hydroxy carbonyl compounds including carboxylic acids such as citric acid and maleic acid; derivatives of 5-hydroxybenzene-1,2,4-tricarboxylic anhydride, such as the 5-acetyl-derivative or a 4-ester-derivative such as the phenyl ester; trimellitic anhydride aryl esters, including trimellitic anhydride phenyl salicylate; and reaction products and combinations comprising at least one of the foregoing, among others, can be employed. Alternatively, poly(arylene ether) may be functionalized with acidic or latent acidic groups in a suitable solvent. Examples of such processes include metallation of poly(arylene ether) in tetrahydrofuran (THF) followed by quenching with carbon dioxide or capping of poly(arylene ether) in toluene solution with trimellitic anhydride acid chloride. Typically, less than or equal to about 10 wt % functionalization agent can be used (based on the weight of the poly phenylene ether and the agent), with less than or equal to about 6 wt % preferred, and about 1.5 wt % to about 4 wt % especially preferred.

In one embodiment, the poly(arylene ether) comprises a capped poly(arylene ether). The capping may be used to prevent the oxidation of terminal hydroxy groups on the poly(arylene ether) chain. The terminal hydroxy groups may be inactivated by capping with an inactivating capping agent via an acylation reaction, for example. The capping agent chosen is desirably one that results in a less reactive poly (arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. The preferred capping agents are salicylic carbonate and the polysalicylates, especially linear polysalicylates. When capped, the poly(arylene ether) may be capped to any desirable extent up to 80 percent, more preferably up to about 90 percent, and even more preferably up to 100 percent of the hydroxy groups are capped. Suitable capped poly(arylene ether) and their preparation are described in U.S. Pat. Nos. 4,760,118 to White et al. and U.S. Pat. No. 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly (arylene ether). The aminoalkyl group, ortho to the terminal hydroxy group of the poly(arylene ether), is susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkylbenzamine (salicylamide). The removal of the amino group and the capping provides a poly(arylene ether) that is more stable to high temperatures, thereby resulting in fewer degradative products, such as gels or black specks, during processing of the poly(arylene ether).

Based upon the foregoing, it will be apparent to those skilled in the art that the contemplated poly(arylene ether) resin may include many of those poly(arylene ether) resins presently known, irrespective of variations in structural units or ancillary chemical features.

The poly(arylene ether)s are typically prepared by the oxidative coupling of at least one monohydroxyaromatic compound in the presence of a catalyst system and solvent. There is no particular limitation on the monohydric phenol used in the poly (arylene ether) synthesis. Suitable monohydroxyaromatic compounds include those according to the following formula (II)

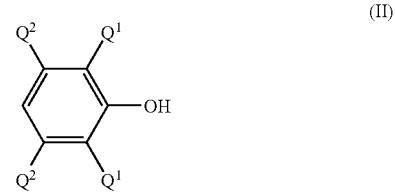

(II)

wherein each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen or $C_{1-4}$ alkyl. Preferred monohydroxyphenols include 2,6-dimethylphenol and 2,3,6-trimethylphenol.

In one embodiment, the monohydroxyphenol is 2,6-dimethylphenol having a purity of greater than about 99 weight percent, preferably greater than about 99.67 weight percent, and more preferably greater than about 99.83 weight percent. Additionally, the 2,6-dimethylphenol preferably comprises less than about 0.004 weight percent phenol and more preferably less than about 0.003 weight percent phenol. It is preferred that the 2,6-dimethylphenol comprising less than about 0.12 weight percent cresol and preferably less than about 0.087 weight percent cresol. Cresol includes, for example, o-cresol, m-cresol, p-cresol, or a combination comprising at least one of the foregoing cresols. The 2,6-dimethylphenol may comprise less than about 0.107 weight percent other mono-, di- and/or trialkylphenols and preferably less than about 0.084 weight percent. The other mono-, di- and/or trialkylphenols may include, for example, 2,3, 6trimethylphenol, 2,6-ethylmethylphenol, 2-ethylphenol, 2,4,6-trimethylphenol, or a combination comprising at least one of the foregoing other mono-, di- and/or trialkylphenols. Finally, the 2,6-dimethylphenol preferably comprises less than about 0.072 weight percent of another dimethylphenol besides 2,6-dimethylphenol, more preferably less than about 0.055 weight percent of another dimethylphenol. The other dimethylphenol may be 2,4-dimethylphenol, 2,3-dimethylphenol, 2,5-dimethylphenol, 3,5-dimethylphenol, 3,4-dimethylphenol, or a combination comprising at least one of the foregoing dimethylphenols. It is believe that minimizing the amounts of phenol, cresol, other dimethylphenols, and mono-, di-, and/or trialkylphenols in the 2,6-dimethylphenol monomer will help to reduce undesired branching or chain stopping reactions and to maintain the integrity of the resulting poly(phenylene ether) physical properties.

The oxidative coupling of the monohydric phenol uses an oxygen-containing gas, which is typically oxygen ($O_2$) or air, with oxygen being preferred.

Suitable organic solvents for the oxidative coupling include aliphatic alcohols, ketones, aliphatic and aromatic hydrocarbons, chlorohydrocarbons, nitrohydrocarbons, ethers, esters, amides, mixed ether-esters, sulfoxides, and the like, and combinations comprising at least one of the foregoing organic solvents, providing they do not interfere with or enter into the oxidation reaction. Preferred solvents include $C_6$–$C_{18}$ aromatic hydrocarbons such as benzene, toluene, and xylene; halogenated hydrocarbons such as dichloromethane, and chloroform; and halogenated aromatic hydrocarbons such as chlorobenzene and dichlorobenzene.

The solvent may comprise, in addition to a $C_6$–$C_{18}$ aromatic hydrocarbon, a $C_3$–$C_8$ aliphatic alcohol that is a poor solvent for the poly(arylene ether), such as, for example, n-propanol, isopropanol, n-butanol, t-butanol, n-pentanol, and the like, and combinations comprising at least one of the foregoing $C_3$–$C_8$ aliphatic alcohols. The solvent may further comprise, in addition to a $C_6$–$C_{18}$ aromatic hydrocarbon and a $C_3$–$C_8$ aliphatic alcohol, methanol or ethanol, which act as an anti-solvent for the poly (arylene ether). The $C_6$–$C_{18}$ aromatic hydrocarbon, the $C_3$–$C_8$ aliphatic alcohol, and the methanol or ethanol may be combined in any proportion, but it may be preferred that the solvent comprise at least about 50 weight percent of the $C_6$–$C_{18}$ aromatic hydrocarbon.

Catalyst systems typically contain at least one heavy metal compound such as a copper, manganese or cobalt compound, usually in combination with various other materials. Suitable catalyst systems include cuprous chloride, cupric chloride, cuprous bromide, cupric bromide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate and cuprous benzoate; and similar manganese salts and cobalt salts. Instead of direct addition of the above-exemplified metal salt, it is also possible to add a metal or a metal oxide and an inorganic acid, organic acid or an aqueous solution of such an acid and form the corresponding metal salt or hydrate.

The catalyst systems may also be complexed with a mono- or dialkylamine, aromatic amines or N,N'-dialkylalkylenediamines. Non-limiting examples of suitable primary, secondary or tertiary amines include mono- and dimethylamine, mono- and diethylamine, mono- and dipropylamine, mono- and dibutylamine, mono- and dibenzylamine, mono- and dicyclohexylamine, mono- and diethanolamine, methylethylamine, methylpropylamine, methylcyclohexylamine, ethylisopropylamine, benzylmethylamine, octylchlorobenzylamine, methylphenethylamine, benzylethylamine, dimethylbutylamine, N,N'-dialkylethylenediamines such as N,N'-di-tert-butylethylenediamine, and N,N'-di-isopropylethylenediamine, N,N,N'-trialkylethylenediamines, N,N'-dialkylpropylenediamines and N,N,N'-trialkylpropylenediamines.

Known processes to prepare poly(phenylene ether)s include European patent documents EP 1167421A2; EP 1167419A2; and EP 1167420A1, all of which are incorporated herein by reference. Further methods for preparing poly(phenylene ether)s are described, for example, in U.S. Pat. Nos. 6,407,200, 5,250,486; 5,017,655; 4,092,294; 4,083,828; 4,054,553; 3,962,181; 3,838,102; 3,733,299; 3,661,848; 3,642,699; 3,639,656; 3,365,422; 3,306,875; and 3,306,874, all of which are incorporated herein by reference. Based upon the foregoing, it will be apparent to those skilled in the art that the contemplated poly(arylene ether) may prepared by all methods presently known, irrespective of variations in processing conditions, reagents, or catalysts.

In one embodiment, poly(phenylene ether) isolated by precipitation preferably has a copper content of less than about 15 parts per million and more preferably less than about 5 parts per million. Additionally, the precipitated poly(phenylene ether) comprises an amount of titratable amine content of less than about 1.27 weight percent and preferably less than about 1.18 weight percent. A titratable amine content that is too high results in a poly(phenylene ether) having a strong odor, while too little amine content may result in a polymer having poor mechanical properties.

The term poly(alkenyl aromatic) resin as used herein includes polymers prepared by methods known in the art including bulk, suspension, and emulsion polymerization, which contain at least 25% by weight of structural units derived from an alkenyl aromatic monomer having the structure (III)

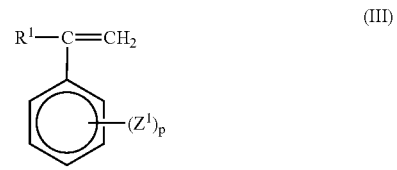

(III)

wherein $R^1$ is hydrogen, $C_1$–$C_8$ alkyl, or halogen; $Z^1$ is vinyl, halogen or $C_1$–$C_8$ alkyl; and p is 0 to 5. Preferred alkenyl aromatic monomers include styrene, chlorostyrene, and vinyltoluene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$–$C_{10}$ nonaromatic diene monomer, such as butadiene or isoprene, and wherein the rubber-modified poly(alkenyl aromatic) resin comprises about 98 to about 70 weight percent of the homopolymer of an alkenyl aromatic monomer and about 2 to about 30 weight percent of the rubber modifier, preferably about 88 to about 94 weight percent of the homopolymer of an alkenyl aromatic monomer and about 6 to about 12 weight percent of the rubber modifier. These rubber modified polystyrenes include high impact polystyrene (commonly referred to as HIPS).

The poly(alkenyl aromatic) resins also include non-elastomeric block copolymers, for example diblock, triblock, and multiblock copolymers of styrene and a polyolefin. Non-elastomeric block copolymer compositions of styrene and butadiene can also be used that have linear block, radial block or tapered block copolymer architectures wherein the butadiene component is present up to about 35 weight percent. They are commercially available from such companies as Atofina as under the trademark FINACLEAR and Chevron Phillips Chemical Company under the trademark K-RESINS.

The poly(alkenyl aromatic) resins may also include block copolymers of styrene-polyolefin-methyl methacrylate, especially poly(styrene-b-1,4butadiene-b-methyl methacrylate (SBM) available from Atofina comprising blocks of polystyrene, 1,4-polybutadiene, and syndiotactic polymethyl methacrylate. SBM block copolymers available from Atofina include AF-X223, AF-X333, AF-X012, AF-X342, AF-X004, and AF-X250.

A preferred poly(alkenyl aromatic) is a homopolymer of the alkenyl aromatic monomer (III) wherein $R^1$ is hydrogen, lower alkyl or halogen; $Z^1$ is vinyl, halogen or lower alkyl; and p is from 0 to 5. A particularly preferred homopolymer of an alkenyl aromatic monomer is the homopolymer derived from styrene (i.e., homopolystyrene). The homopolystyrene preferably comprises at least 99% of its weight, more preferably 100% of its weight, from styrene.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Atactic homopolystyrenes are sometimes referred to herein as "crystal polystyrene" resins. Useful syndiotactic polystyrene resins (SPS) are available from The Dow Chemical Company under the QUESTRA trademark.

The poly(alkenyl aromatic) may have a number average molecular weight of about 20,000–100,000 atomic mass units (amu) and a weight average molecular weight of about 10,000–300,000 amu.

The filtered polymeric material obtained may comprise poly(arylene ether) in an amount of about 90 to about 10 weight percent and poly(alkenyl aromatic) in an amount of about 10 to about 90 weight percent, based on the total weight of the poly(alkenyl aromatic) and resin poly(arylene ether). Within this range the amount of poly(arylene ether) may be less than or equal to about 80 weight percent, less than or equal to about 70 weight percent preferred, and less than or equal to about 60 weight percent more preferred. Also preferred within this range is an amount greater than or equal to about 20 weight percent, greater than or equal to about 30 weight percent preferred, and greater than or equal to about 40 weight percent more preferred. Within this range the amount of poly(alkenyl aromatic) may be less than or equal to about 80 weight percent, less than or equal to about 70 weight percent preferred, and less than or equal to about 60 weight percent more preferred. Also preferred within this range is an amount greater than or equal to about 20 weight percent, greater than or equal to about 30 weight percent preferred, and greater than or equal to about 40 weight percent more preferred.

Also contemplated are filtered polymeric materials further comprising additional resins in addition to the poly(arylene ether) and/or the poly(alkylene aromatic). Examples of additional resins include polyamides, poly(phenylene sulfide)s, polyetherimides, polyolefins, and the like.

The filtered polymeric material may, optionally, further comprise an additive selected from flame retardants, mold release agents and other lubricants, antioxidants, thermal stabilizers, ultraviolet stabilizers, pigments, dyes, colorants, anti-static agents, conductive agents, fillers, and the like, and a combination comprising at least one of the foregoing additives. Selection of particular additives and their amounts may be performed by those skilled in the art. If the additives are present in the polymeric material prior to filtration, the additive should be selected so as to not interfere with the particular filtration system chosen for the method. Optionally, additives may be added to the filtered polymeric material after the filtration step by methods known in the art, either prior to or post isolation of the filtered polymeric material. Furthermore, for some applications the presence of the additives must not adversely affect the surface quality of articles molded from the material. Special processing conditions during molding may be required to ensure an adequately smooth surface when molding filled articles.

Examples of pigments and dyes known to the art include those described in the chapter "Colorants" in "Plastic Additives Handbook, 4$^{th}$ Edition" R. Gachter and H. Muller (eds.), P. P. Klemchuck (assoc. ed.) Hansen Publishers, New York 1993.

Colorants include organic and inorganic pigments and dyes. Suitable inorganic colorants include carbon black, iron oxide, titanium dioxide, zinc oxide, zinc sulfide, and the like. Suitable organic colorants include those from the following chemical classes: anthanthrone, anthraquinone, benzimidazolone, diketopyrrolo-pyrrole, dioxazine, diazo, indanthrone, isoindoline, isoindolinone, naphthol, perinone, perylene, phthalocyanine, pyranthrone, quinacridone, quinophthalone, and the like.

The filtered polymeric material may also comprise flame retardants including non-halogenated flame retardants such as phosphate flame retardants, and halogenated flame retardants. Examples of suitable flame retardants include those found in the "Plastic Additives Handbook" under the chapter "Flame Retardants".

In one embodiment, prior to melt filtration, the poly(arylene ether) and/or poly(alkenyl aromatic) may be dissolved in a suitable solvent to form a solution which may be filtered through one or more solution filtration systems to form a filtrate. The poly(arylene ether) and/or poly(alkenyl aromatic) may be isolated from the filtrate prior to its introduction to the compounder, if used, or to the extruder employed to form the melt. Optionally the filtrate may be concentrated to a weight percent solids to form a concentrate which is then fed to the extruder comprising the melt filtration system. A weight percent solids of the concentrate comprising poly(arylene ether) and/or poly(alkenyl aromatic) may range from about 10 to about 99 weight percent based on the total weight of polymeric material and solvent.

Suitable solvents for use in the solutions to be filtered from the above-described embodiment include a halogenated aromatic solvent, a halogenated aliphatic solvent, a non-halogenated aromatic solvent, a non-halogenated aliphatic solvent, or a mixture thereof. Suitable halogenated aromatic solvents include, but are not limited to, halobenzenes, ortho-dichlorobenzene, chlorobenzene, and the like. Suitable halogenated aliphatic solvents include, but are not limited to, chloroform, methylene chloride, 1,2-dichloroethane, and the like. Suitable non-halogenated aromatic solvents include, but are not limited to, benzene, toluene, xylenes, anisole, nitrobenzene, and the like. Suitable non-halogenated aliphatic solvents include, but are not limited to, acetone, ethyl acetate, and the like. The solvent may be the same as the polymerization solvent employed in the process of producing a poly(arylene ether) resin.

Suitable solution filtration systems include filters made from a variety of materials such as, but not limited to, sintered-metal, cloth, polymeric fiber, natural fiber, paper, metal mesh, pulp, ceramic, or a combination of the foregoing materials, and the like.

The geometry of the filter employed in the solution filtration system may be cone, pleated, candle, stack, flat, wraparound, or a combination of the foregoing, and the like.

The pore size of the filter employed in the solution filtration system may be of any size ranging from 0.01 to 100 micrometer, or greater. Within this range, a pore size of less than or equal to about 50 micrometers can be employed, with less than or equal to about 20 micrometers preferred, and less than or equal to about 15 micrometers more preferred. Also preferred within this range is a pore size of greater than or equal to about 0.1 micrometer, with greater than or equal to about 3 micrometers more preferred, and greater than or equal to about 5 micrometers especially preferred.

Suitable solution filtration processes may include gravity filtration, pressure filtration, vacuum filtration, batch filtration, continuous filtration, or a combination of the foregoing filtration methods, and the like.

There is no particular limitation on the method by which the poly(arylene ether) and/or poly(alkenyl aromatic) may be isolated from the filtrate. Suitable processes known in the art to remove a solvent from a resin are applicable. Such processes include, but are not limited to, precipitation, distillation, spray drying, devolatilization, and the use of flash vessels to evaporate the solvent. The several processes described herein for isolation may be used alone or in combination. When isolated, the poly(arylene ether) and/or poly(alkenyl aromatic) may be in the form of a powder, pellet, flake or a feed directly from the isolation process to the extruder comprising the melt filtration system.

Many of the isolation processes described above may be used to concentrate the filtrate without entirely removing the solvent from the filtrate, but instead to provide a concentrate having an increased percent solids which may be fed into the extruder employed for melt filter. When a concentrate is fed into the extruder, the extruder is preferably a devolatiliztion extruder capable of removing solvent in the melt.

Devolatilizing extruders and processes are known in the art and typically involve a twin-screw extruder equipped with multiple venting sections for solvent removal. The devolatilizing extruders most often contain screws with numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including Welding Engineers, Inc.

In one embodiment, isolation comprises pre-concentration of the filtrate (partial evaporation of the solvent) and devolatilization extrusion steps. During pre-concentration, the major part of the solvent is removed by evaporation, preferably at an elevated temperature, for example in the range from about 150 to about 300° C., more preferably in the range of about 180 to about 260° C., and/or elevated pressure, for example in the range from about 2 to about 75 bar, more preferably in the range of about 5 to about 50 bar. Pre-concentration removes about 1.0 to 99 percent of the solvent present in the filtrate. Within this range preferably less than or equal to about 90 percent, more preferably less than or equal to about 80 percent of the solvent is removed. Pre-concentration is followed by devolatilization extrusion to remove the residual solvent.

If a pre-concentration step is used before the devolatilization step, the filtrate is preferably concentrated to about 10 to about 99 weight percent solids level based on the total of solvent and polymeric material. Concentrated solutions of the filtrate may be isolated from the remaining solvent by a devolatilization process.

In another embodiment, a method of purifying a polymeric material comprises melt blending poly(arylene ether) and poly(alkenyl aromatic) in a twin screw extruder to form a melt; and melt filtering the melt through a melt filtration system to produce a filtered polymeric material; wherein the extruder has a specific throughput rate of about 0.5 kg/cm$^3$ to about 8 kg/cm$^3$.

In one embodiment, a method of purifying a polymeric material comprises melt blending about 60 to about 30 weight percent of poly(phenylene ether) and about 40 to about 70 weight percent of polystyrene based on the total weight of poly(phenylene ether) and polystyrene in an extruder to form a melt; and melt filtering the melt through a melt filtration system to produce a filtered polymeric material, wherein the filtered polymeric material is substantially free of visible particulate impurities; and wherein the melt has a residence time in the extruder of less than or equal to about 1 minute.

In yet another embodiment, articles are made from the filtered polymeric materials prepared by any one of the methods presented herein. Particularly preferred articles include data storage media, such as but not limited to, optical, magneto or magneto-optical data storage media. Such media include compact discs, re-writable compact discs, digital versatile disks, high density disks for data archival technology (DVR, such as BLU-RAY DISC), and the like.

The articles may be made by a variety of molding and processing techniques. Suitable techniques to form articles include injection molding, foaming processes, injection-compression, rotary molding, two shot molding, microcellular molding, film casting, extrusion, press molding, blow molding, direct molding (see generally WO 02/43943 to Adedeji et al.), and the like. A preferred technique is injection molding.

If the filtered polymeric material is used to form a data storage media substrate, for example, additional processing such as electroplating, coating techniques (spin coating, spray coating, vapor deposition, screen printing, painting, dipping, sputtering, vacuum deposition, electrodeposition, meniscus coating, and the like), lamination, data stamping, embossing, surface polishing, fixturing, and combinations comprising at least one of the foregoing processes, among others conventionally known in the art, may be employed to dispose desired layers on the polymeric material substrate. Essentially, the substrate may optionally be formed, in situ, with the desired surface features disposed thereon on one or both sides, a data storage layer such as a magneto-optic material also on one or both sides, and an optional protective, dielectric, and/or reflective layers. The substrate can have a substantially homogenous, tapered, concave, or convex geometry, with various types and geometries of reinforcement optionally employed to increase stiffness without adversely effecting surface integrity and smoothness.

An example of a polymeric material storage media comprises an injection molded filtered polymeric material substrate that may optionally comprise ahollow (bubbles, cavity, and the like) or filler (metal, plastics, glass, ceramic, etc., in various forms such as fibers, spheres, etc.) core. Disposed on the substrate are various layers including: a data layer, dielectric layer(s), a reflective layer, and/or a protective layer. These layers comprise conventional materials and are disposed in accordance with the type of media produced. For example, for a first surface media, the layers may be protective layer, dielectric layer, data storage layer, dielectric layer, and then the reflective layer disposed in contact with the substrate. A preferred data storage media that may be prepared from the polymeric material described herein is disclosed in application Ser. No. 10/648,609 entitled "Sub strate and storage media for data for data prepared therefrom" filed Aug. 26, 2003, published U.S. Application 2005-0048252 A1 and copending with the present application.

The invention is further illustrated by the following non-limiting examples.

EXAMPLES

Four example runs (Example runs 1–4) were performed to illustrate the method of melt filtering a melt comprising polyphenylene ether and polystyrene to form a polymeric material having reduced levels of particulate impurities.

Example run 1: A 40/60 percent by weight blend of polyphenylene ether (PPE, powder, 0.33 IV available from GE Plastics) and polystyrene (xPS, Novacor 2272; Mw 214,000, Mn 71,600, Mw/Mn 2.99; available from Nova Chemical) was compounded in a 40 millimeter (mm) compounder with a vacuum vent. A vacuum was applied to the vent at about 20 inches of mercury (508 millimeters of Hg). The compounded material was fed to a single screw extruder equipped with 3 barrels (zones). The extruder was equipped with a sintered metal filter (PALL, 3 micrometer pores, candle geometry) located at the extruder die head.

The extruded melt strands were run through a clean, filtered water bath, the water having been filtered through a 10 micrometer filter to remove rust and impurities. The cooled strands of extruded polymeric material were dried and pelletized. Batches of the extruded melt were collected throughout the run, about every half hour. The extruder processing conditions are provided in Table 1.

The procedure of Example run 1 was repeated for Example run 2 except that a 30 mm compounder was employed. The extruder processing conditions for Example run 2 are also provided in Table 1.

The procedure of Example run 1 was repeated for Example runs 3 and 4. The PPE-xPS formulation for Example runs 3 and 4 was a 50/50 percent by weight blend of 0.33 IV PPE and EB3300 grade xPS (Mw 276,000, Mn 51,500, Mw/Mn 5.36; available from Chevron Phillips Chemical). A 40 mm compounder was used for Example run 3, while a 30 mm compounder was used for Example run 4. The processing conditions for Example runs 3 and 4 are provided in Table 1. For all of the Examples the drive, rate, pressure, and melt temperature are averaged for the entire run.

TABLE 1

| Example | 1 | 2 | 3 | 4 |
|---|---|---|---|---|
| Zone 1 (° C.) | 232 | 232 | 232 | 232 |
| Zone 2 (° C.) | 260 | 260 | 260 | 260 |
| Zone 3 (° C.) | 277 | 277 | 277 | 277 |
| Filter 1 (° C.) | 277 | 277 | 277 | 277 |
| Filter 2 (° C.) | 277 | 277 | 277 | 277 |
| Die (° C.) | 277 | 277 | 277 | 277 |
| Screw (rpm) | 85 | 100 | 85 | 85 |
| Drive (amps) | 8.0 | 7.4 | 10.0 | 11.0 |

TABLE 1-continued

| Example | 1 | 2 | 3 | 4 |
|---|---|---|---|---|
| Rate (kg/hr) | 6.1 | 6.9 | 7.0 | 6.8 |
| Filter In Press. (kg/cm$^2$) | 198 | 227 | 201 | 275 |
| Filter Out Press. (kg/cm$^2$) | 26 | 14 | 25 | 27 |
| Filter In Melt Temp. (° C.) | 278 | 318 | 279 | 281 |
| Filter Out Melt Temp. (° C.) | 292 | 298 | 296 | 296 |
| Visible Specks (avg.) | 3.3 | 2 | 1.6 | 1.7 |
| Filter Type/pore size (micrometer) | PALL candle, 3 | PALL candle, 3 | PALL candle, 3 | PALL candle, 3 |

Samples from the runs of Examples 1–4 were tested for visual particulates according to the following procedure. Samples of polymeric material for each run were taken about every half hour for each of the Example runs (1–4). Each sample was tested twice for visible particulates. Two ounce sample bottles with polyseal caps were subjected to a stream of filtered air to remove any particulates present. The bottles were then rinsed with a small amount of HPLC grade chloroform (CHCl$_3$). Fifty milliliters (ml) of HPLC grade CHCl$_3$ was added to each sample bottle. Using a lightbox, the number of visible specks or fibers was recorded for each CHCl$_3$ blank. A 10.00 gram amount of a sample was weighed out on a clean aluminum pan and added to one of the bottles containing CHCl$_3$. This procedure was repeated for every sample. The samples were allowed to dissolve and then viewed in the lightbox for the presence of visible specks. An average number of specks were calculated for each run, four runs total (Examples 1–4). The results of the visible particle analysis for Example runs 1–4 are found in Table 2.

Two samples from Example run 2 (Ex. 2, S1 and Ex. 2, S2), one sample from Example run 3 (Ex. 3, S1), and two samples from Example run 4 (Ex. 4, S1 and Ex. 4, S2) were tested for particulate content according to the procedure below. Amounts of particulates having sizes ranging from 5 micrometers to 100 micrometers were determined using a Pacific Instruments ABS2 analyzer which employs a laser light scattering technique. A 40.0 gram amount of each sample was dissolved in 400 ml of HPLC grade CHCl$_3$ contained in a clean polyethylene bottle. A 20 ml quantity of each sample solution was allowed to flow through the ABS2 analyzer detector at a flow rate of 1 ml/minute (+/−5%). The amount of particulates of varying sizes present in the sample was measured in the detector during this process. Each sample was tested five times and averaged to yield a final number. Two comparative examples were prepared and tested. Comparative Example 1 (CE 1) was an unfiltered blend of 50/50 weight percent 0.33 IV PPE/EB3300 grade xPS. Comparative Example 2 (CE 2) was optical quality polycarbonate (OQ-PC, LEXAN® 1050 available from GE Plastics). The results of the ABS2 analyzer particle analysis in particles per gram can be found in Table 2, along with the blank data (CHCl$_3$ alone).

TABLE 2

| | Particulate Size (micrometers) | | | | | | | |
|---|---|---|---|---|---|---|---|---|
| Example, Sample # | 5 | 10 | 15 | 20 | 30 | 40 | 50 | 100 |
| | Particles per gram | | | | | | | |
| Ex. 2, S1 | 654.3 | 111 | 38.7 | 23.3 | 3.2 | 0.9 | 1.2 | 0.1 |
| Ex. 2, S2 | 561.8 | 91.1 | 34.4 | 16.5 | 1.9 | 0.4 | 0.6 | 0.1 |

TABLE 2-continued

| | Particulate Size (micrometers) | | | | | | | |
|---|---|---|---|---|---|---|---|---|
| Example, Sample # | 5 | 10 | 15 | 20 | 30 | 40 | 50 | 100 |
| | Particles per gram | | | | | | | |
| Ex. 3, S1 | 689.8 | 90 | 32.7 | 15.6 | 2.6 | 0.5 | 0.4 | 0.1 |
| Ex. 4, S1 | 1919.9 | 143.7 | 44.3 | 20.1 | 2.4 | 0.6 | 0.2 | 0 |
| Ex. 4, S2 | 1117.5 | 114.8 | 42.9 | 26.6 | 3.6 | 1.8 | 0.2 | 0 |
| CE 1 | 6901.25 | 1237.5 | 500 | 396.25 | 85 | 23.75 | 30 | 5 |
| CE 2 | 317.000 | 58.88 | 52.88 | 14.88 | 3.38 | 0.75 | 0 | 0 |
| CHCl$_3$ | 15.15 | 3.65 | 1.25 | 0.25 | 0 | 0 | 0 | 0 |

The results of the above experiments show a significant reduction of particulate impurities between the unfiltered sample (CE 1) and the corresponding filtered samples (Ex. 3, S1; Ex. 4, S1; and Ex. 4, S2). Furthermore, the particulate impurity level of the Examples of the present method is comparable to or better than OQ-PC with regard to particulates of 15 micrometers or greater.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A method of purifying a polymeric material, comprising:
   melt blending poly(arylene ether) and poly(alkenyl aromatic) in an extruder to form a melt; and
   melt filtering the melt through a melt filtration system to produce a filtered polymeric material;
   wherein the melt has a residence time in the extruder of less than or equal to about 1 minute;
   wherein the melt filtration system is maintained at a temperature of about 280° C. to about 380° C.; and
   wherein the filtered polymeric material is substantially free of visible particulate impurities such that a ten gram sample of polymeric material dissolved in fifty milliliters of chloroform exhibits fewer than 5 visible specks when viewed with the aid of a light box.

2. The method of claim 1, wherein the filtered polymeric material is substantially free of particulate impurities having a diameter of about 10 micrometers or greater.

3. The method of claim 1, wherein the melt blending and the melt filtering occur in the same extruder.

4. The method of claim 1, wherein the melt filtration system comprises a sintered-metal filter, a metal mesh filter, a fiber metal felt filter, a ceramic filter, or a combination comprising at least one of the foregoing filters.

5. The method of claim 1, wherein the melt filtration system comprises a filter having a geometry that is cone, pleated, candle, stack, flat, wraparound, or a combination comprising at least one of the foregoing geometries.

6. The method of claim 1, wherein the melt filtration system comprises a continuous filtration system or a batch filtration system.

7. The method of claim 1, wherein the melt filtration system comprises a filter having a pore size of about 0.5 to about 200 micrometers.

8. The method of claim 1, wherein the melt filtration system comprises a filter having a pore size of about 1.0 to about 15 micrometers.

9. The method of claim 1, wherein the melt filtration system is maintained at a temperature of about 290° C. to about 380° C.

10. The method of claim 1, wherein the extruder is a twin screw counter-rotating extruder, a twin screw co-rotating extruder, a single screw extruder, a single screw reciprocating extruder, or a ring extruder.

11. The method of claim 1, wherein the extruder further comprises a melt pump.

12. The method of claim 1, further comprising pelletizing the filtered polymeric material.

13. The method of claim 1, wherein the poly(arylene ether) comprises a plurality of structural units of the structure

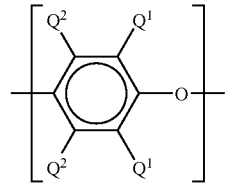

wherein for each structural unit, each $Q^1$ is independently halogen, primary or secondary $C_1$–$C_7$ alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms.

14. The method of claim 1, wherein the poly(arylene ether) has an intrinsic viscosity of about 0.10 to about 0.60 deciliters per gram as measured in chloroform at 25° C.

15. The method of claim 1, wherein the poly(alkenyl aromatic) contains at least 25% by weight of structural units derived from an alkenyl aromatic monomer of the formula

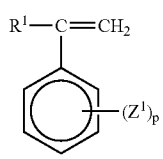

wherein $R^1$ is hydrogen, $C_1$–$C_8$ alkyl, or halogen; $Z^1$ is vinyl, halogen or $C_1$–$C_8$ alkyl; and p is 0 to 5.

16. The method of claim 15, wherein the poly(alkenyl aromatic) has a weight average molecular weight in the range of about 100,000 to about 500,000.

17. The method of claim 1, wherein the poly(alkenyl aromatic) is atactic crystal polystyrene.

18. The method of claim 1, herein the filtered polymeric material comprises about 90 to about 10 percent by weight of the poly(arylene ether) and about 10 to about 90 percent by weight of the poly(alkenyl aromatic).

19. The method of claim 1, wherein the filtered polymeric material comprises about 60 to about 30 percent by weight of the poly(arylene ether) and about 40 to about 70 percent by weight of the poly(alkenyl aromatic).

20. The method of claim 1, wherein the filtered polymeric material further comprises flame retardants, mold release agents, lubricants, antioxidants, thermal stabilizers, ultraviolet stabilizers, pigments, dyes, colorants, anti-static agents, conductive agents, or a combination comprising at least one of the foregoing additives.

21. The method of claim 1, further comprising compounding the poly(arylene ether) and poly(alkenyl aromatic) prior to melt blending.

22. The method of claim 21, wherein the compounding is performed in a counterrotating conical extruder, or a counterrotating extruder.

23. The method of claim 1, further comprising:
filtering a solution comprising solvent, poly(arylene ether), and poly(alkenyl aromatic) through a solution filtration system to form a filtrate;
removing solvent from the filtrate to form a concentrate comprising poly(arylene ether) and the poly(alkenyl aromatic); and
feeding the concentrate to the extruder to form the melt.

24. A method of purifying a polymeric material, comprising:
melt blending about 60 to about 30 weight percent of poly(phenylene ether) and about 40 to about 70 weight percent of polystyrene based on the total weight of poly(phenylene ether) and polystyrene in an extruder to form a melt; and
melt filtering the melt through a melt filtration system to produce a filtered polymeric material, wherein the filtered polymeric material is substantially free of visible particulate impurities such that a ten gram sample of polymeric material dissolved in fifty milliliters of chloroform exhibits fewer than 5 visible specks when viewed with the aid of a light box;
wherein the melt filtration system is maintained at a temperature of about 280° C. to about 380° C.; and
wherein the melt has a residence time in the extruder of less than or equal to about 1 minute.

25. A method of purifying a polymeric material, comprising:
melt blending poly(arylene ether) and poly(alkenyl aromatic) in a twin screw extruder to form a melt; and
melt filtering the melt through a melt filtration system to produce a filtered polymeric material, wherein the filtered polymeric material is substantially free of visible particulate impurities such that a ten gram sample of polymeric material dissolved in fifty milliliters of chloroform exhibits fewer than 5 visible specks when viewed with the aid of a light box;
wherein the extruder has a specific throughput rate of about 0.5 kg/cm$^3$ to about 8 kg/cm$^3$; and
wherein the melt filtration system is maintained at a temperature of about 280° C. to about 380° C.

26. An article comprising the filtered polymeric material prepared by the method of claim 1, wherein the article is formed by injection molding, blow molding, extrusion, sheet extrusion, film extrusion, profile extrusion, pultrusion, compression molding, thermoforming, pressure forming, hydroforming, or vacuum forming.

27. A data storage medium comprising the filtered polymeric material prepared by the method of claim 1.

28. A method of purifying a polymeric material, comprising:
melt blending poly(arylene ether) and poly(alkenyl aromatic) in an extruder to form a melt; and
melt filtering the melt through a melt filtration system to produce a filtered polymeric material;
wherein the melt has a residence time in the extruder of less than or equal to about 1 minute;
wherein the melt filtration system is maintained at a temperature of about 280° C. to about 380° C.;
wherein the melt filtration system comprises a filter having a pore size of about 0.5 to about 1 micrometer; and wherein the filtered polymeric material is substantially free of visible particulate impurities such that a ten gram sample of polymeric material dissolved in fifty milliliters of chloroform exhibits fewer than 5 visible specks when viewed with the aid of a light box.

* * * * *